United States Patent
Lochmahr et al.

(10) Patent No.: US 6,194,855 B1
(45) Date of Patent: Feb. 27, 2001

(54) VARIABLE DRIVE WITH PROTECTION AGAINST JAMMING FOR MOVABLE PARTS

(75) Inventors: Gunnar Lochmahr, Leonberg; Johannes Heib, Buehlertal; Volker Aab, Lichtenau-Ulm, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/125,889

(22) PCT Filed: Jan. 20, 1997

(86) PCT No.: PCT/DE97/00086

§ 371 Date: Jan. 13, 1999

§ 102(e) Date: Jan. 13, 1999

(87) PCT Pub. No.: WO97/32102

PCT Pub. Date: Sep. 4, 1997

(30) Foreign Application Priority Data

Feb. 27, 1996 (DE) ............................................. 196 07 321
May 8, 1996 (DE) ............................................. 196 18 484

(51) Int. Cl.$^7$ ................................. H02P 1/00; G05B 5/00
(52) U.S. Cl. .......................... 318/283; 318/467; 318/476
(58) Field of Search ..................................... 318/280–282, 318/445–450, 461–477

(56) References Cited

U.S. PATENT DOCUMENTS

| | | | |
|---|---|---|---|
| 4,263,537 | * 4/1981 | Bettin et al. | 318/561 |
| 4,342,379 | * 8/1982 | Games et al. | 187/316 |
| 4,736,144 | * 4/1988 | Chun-Pu | 318/467 |
| 4,891,568 | * 1/1990 | Shibata et al. | 318/560 |
| 5,162,711 | * 11/1992 | Heckler | 318/264 |
| 5,278,480 | * 1/1994 | Murray | 318/626 |
| 5,325,036 | * 6/1994 | Diethert et al. | 318/802 |
| 5,334,876 | * 8/1994 | Washeleski et al. | 307/10.1 |
| 5,351,439 | 10/1994 | Takeda et al. | |
| 5,497,326 | 3/1996 | Bertland et al. | |
| 5,587,642 | * 12/1996 | Manson et al. | 318/812 |
| 5,682,023 | * 10/1997 | McHugh et al. | 187/316 |
| 5,712,546 | * 1/1998 | Holthouse et al. | 318/282 |
| 5,777,280 | * 7/1998 | Braasch et al. | 187/393 |

FOREIGN PATENT DOCUMENTS

| | | |
|---|---|---|
| 38 29 734 | 3/1989 | (DE) . |
| 37 36 400 | 5/1989 | (DE) . |
| 33 03 590 | 6/1989 | (DE) . |
| 42 19 188 | 12/1993 | (DE) . |
| 0 334 028 | 9/1989 | (EP) . |
| 0 561 361 | 9/1993 | (EP) . |
| 0 751 274 | 1/1997 | (EP) . |
| 96/27229 | 9/1996 | (WO) . |

OTHER PUBLICATIONS

Bosch Technical Information, Comined Ignition And Gas Injection System MOTRONIC (1 987 722 011, kh/vdt–Sep. 1985–De). Mentioned in specification.

* cited by examiner

Primary Examiner—Brian Sircus
(74) Attorney, Agent, or Firm—Kenyon & Kenyon

(57) ABSTRACT

In a displacement drive that provides an obstruction prevention function for movable parts, in particular such as windows and sunroofs in motor vehicles, a decrease in the rotation speed or velocity of the drive is provided in order to achieve a predefined spring rate in specific displacement ranges so as to lower the kinetic energy. Within the predefined range before the closed position is reached, the rotation speed and/or the output of the drive is reduced linearly. The reduction to a minimum rotation speed or minimum output takes place within a specific position range. The minimum rotation speed or minimum output is reached at a specific position before the closed position and is substantially constant. Corresponding to different supply output levels, a linear reduction, for example, is performed along lines of different slopes, the length of the specific position range in which the reduction is performed being constant.

19 Claims, 1 Drawing Sheet

VARIABLE DRIVE WITH PROTECTION AGAINST JAMMING FOR MOVABLE PARTS

BACKGROUND INFORMATION

The present invention relates to a displacement drive with an obstruction prevention function for movable parts such as, for example, windows and sunroofs in motor vehicles.

In a displacement drive of this kind known from German Published Patent Application No. 37 36 400 A1, a decrease in the rotation speed or velocity of the drive is performed in order to achieve a predefined spring rate in specific displacement ranges so as to lower the kinetic energy. The movable part is moved by way of a drive motor, through an obstruction hazard range in which foreign objects may become jammed between the movable part and a stationary part, into a closed position. Because of unavoidable delays in signal processing and the inertia of the mechanically moved part, the foreign object can be jammed between the moved part and the stationary part despite a safety apparatus representing the obstruction prevention function. To prevent this, provision is made in the case of this known displacement drive for the displacement velocity during closing of the movable part to be diminished in the obstruction hazard range. The actual obstruction prevention function can then, if applicable, halt the movable part momentarily and possibly reverse the direction of motion.

With this known displacement drive, the decrease in velocity takes place in stages, i.e. operation is switched in one step from a high stage to a low stage of the closing velocity. Switching down abruptly in this fashion can cause the obstruction prevention function to respond incorrectly, and moreover lengthens the closing time.

SUMMARY OF THE INVENTION

According to the present invention, a displacement drive with an obstruction prevention function provides a continuous transition from a high closing velocity to a specific low closing velocity, with an optimized closing time. An incorrect response of the obstruction prevention function is thus reliably prevented.

According to the present invention, this is achieved in principle in that within the predefined range before the "closed" position is reached, the rotation speed and/or the output of the drive is reduced in accordance with a predefined functional relationship. The reduction to a minimum rotation speed or minimum output takes place within a specific position range. This minimum rotation speed or minimum output is reached at a specific position before the "closed" position. The minimum rotation speed or minimum output is substantially constant. The reduction in the rotation speed and/or output of the drive can be predefined in accordance with an arbitrarily selectable functional relationship. Smooth transitions can thereby be implemented.

In an advantageous embodiment of the displacement drive according to the present invention, the reduction in rotation speed is linear. The effort for determining the support points is low.

A further embodiment according to the present invention is based on a reduction in accordance with an exponential function. This allows abrupt changes in rotation speed and/or output to be avoided.

According to a particularly advantageous embodiment of the present invention, the reduction to the minimum rotation speed or minimum output in accordance with a predefined functional relationship is accomplished over a constant position range, the rate of reduction changing as a function of the instantaneous supply power level, in particular the supply voltage.

According to a particularly advantageous further alternative embodiment of the present invention, the reduction to the minimum rotation speed or minimum output is accomplished over a variable position range, the starting point thereof changing as a function of the respective instantaneous supply power level, in particular the supply voltage.

In a particularly advantageous embodiment of the present invention, the necessary minimum rotation speed or minimum output is ascertained empirically, such that sufficiently high closing forces are still guaranteed under all conditions, in particular of temperature and humidity.

In an advantageous embodiment of the present invention, control of the rotation speed or output of the preferably electrical drive is accomplished using semiconductor components, in particular linear controllers or clock-pulse controllers having a variable pulse-to-interpulse ratio.

In a particularly advantageous embodiment of the present invention, provision is made for the displacement drive to be usable together with a circuit for preventing foreign objects from being jammed between the moved part and fixed stop in the "closed" position.

According to an advantageous embodiment of this development of the present invention, the respective known slope of the reduction in accordance with a predefined functional relationship in the rotation speed and/or output of the drive can be taken into account as a correction factor in calculating the reduction in rotation speed due to obstruction events.

In a particularly advantageous embodiment of the present invention, there is provided for the correction an adaptive memory in which the controlled reduction in rotation speed and/or output is stored as a slight slowing.

According to a further advantageous embodiment of the displacement drive according to the present invention, in order to improve the analysis for the obstruction prevention function, the resolution for position sensing is increased by using an EXOR member between two Hall sensors, and/or by using a multiply polarized ring magnet.

A further advantageous embodiment of the present invention provides that when a very small opening width, for example<4 mm, is reached, the rotation speed and/or output can be raised back up to the greatest possible value in order to achieve maximum closing force, in particular in the area of rubber seals.

DETAILED DESCRIPTION

The displacement drive according to the present invention is characterized by a reduction in rotation speed and/or output in accordance with a predefined functional relationship.

The predefined functional relationship for reduction in rotation speed and/or output encompasses the entire spectrum of continuous or discrete mathematical functions suitable for achieving the reduction. In addition to the linear profile described with reference to the exemplary embodiment, a reduction in accordance with an exponential function is possible. With this it is possible to implement acceleration or deceleration operations which guarantee a smooth transition between the two rotation speed and/or output stages. This can also be achieved by way of a reduction in accordance with a sine, cosine, or tangent function, and their inverse functions. Nth-degree polynomials also prevent an abrupt transition, thus decreasing the risk of jamming the pulley. As a representative of the functional relationships described here, the exemplary embodiment of the present invention refers to a linear reduction. The explanations relating thereto may be transferred to any function.

Figure 1:
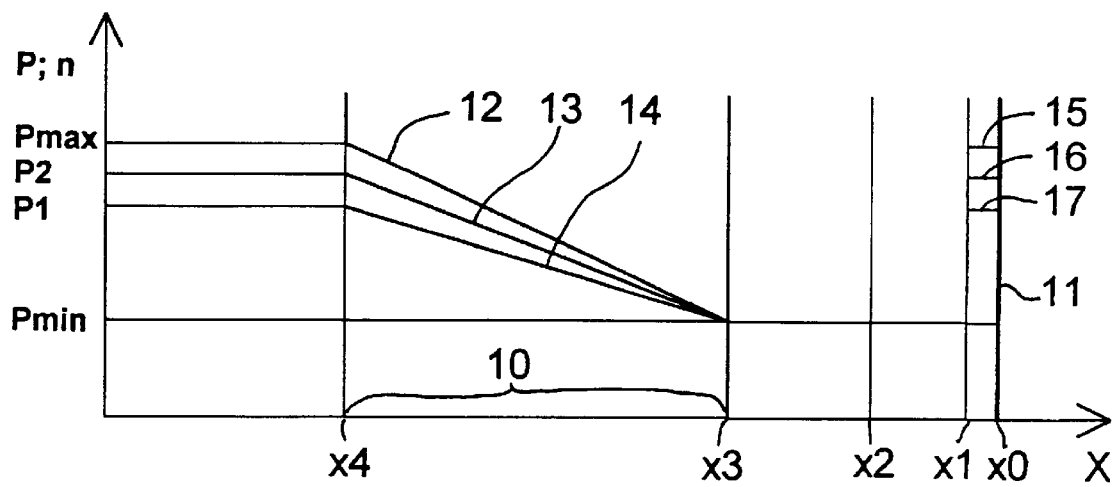
FIG. 1 schematically shows a diagram of a first embodiment of the displacement drive according to the present invention, in which an obstruction prevention function is provided and in which a linear velocity reduction takes place over a constant position range with different changes in velocity.

In FIG. 1, the velocity profile of a first embodiment of the displacement drive according to the present invention with obstruction prevention function is depicted schematically in a diagram. With this embodiment, a linear velocity reduction takes place over a constant position range 10 with different changes in the velocity of the moved part or the rotation speed n of the motor being used, which preferably is an electric motor. The output P or rotation speed n of the displacement drive is plotted on the vertical axis. Plotted on the horizontal axis is the distance x traveled by the driven movable part, up to the immovable stop in the "closed" position depicted by the thick vertical line 11, in the region of an obstruction hazard that is of interest in the context of the present invention, namely up to position x0.

According to the embodiment of FIG. 1, the output P or rotation speed n is reduced linearly in a specific position range, namely between x4 and x3, prior to reaching the "closed" position x0, to a minimum value $p_{min}$ or $n_{min}$. A kind of terminal deceleration thus occurs toward position x3, at which the minimum value is intended to be reached. This minimum value is then held constant until the "closed" position is reached. It is of sufficient magnitude to allow reliable travel all the way to x0. This minimum value is ascertained empirically, advantageously in consideration of the respective circumstances, for each system in which the invention is used. This minimum value is selected to be of sufficient magnitude that reliable travel all the way to the "closed" position x0 is possible in all circumstances, i.e. for example also taking into account different temperatures and humidity levels.

With the embodiment depicted in FIG. 1, the specific position range 10 within which the reduction takes place has a constant length x4–x3, and the reduction in output P and/or rotation speed n takes place with a different slope corresponding to lines 12, 13, and 14. The linear reduction is terminated when a specific position, i.e. x3, is reached. At that point, a minimum value for output $P_{min}$ and/or rotation speed $n_{min}$ has been reached. With lines 12 the slope is greatest, so that the reduction rate of the decline in output or rotation speed is also greatest. This line 12 begins at position x4 from maximum output $P_{max}$, which may correspond, for example in the case of a motor vehicle, to the maximum supply voltage of the battery. With lines 13, the slope is less than with lines 12, so that the reduction rate of the decline in output or rotation speed is also less. This line 13 begins at position x4 from a lower output P2, which may correspond, for example in the case of a motor vehicle, to a battery supply voltage which is less than the maximum. With lines 14 the slope is even less, and the reduction rate of the decline in output or rotation speed is thus also even less. This line 14 also begins at position x4, but from an output P1 which corresponds, for example in the case of a motor vehicle, to an even lower battery supply voltage. The minimum output $P_{min}$ may be associated with the minimum permissible supply voltage. The linear reduction is thus accomplished in such a way that regardless of the instantaneous supply power level, the procedure always begins at a specific position, i.e. x4. At a fixed position, i.e. x3, the reduction terminates at the minimum value. With this embodiment the differences in instantaneous supply output are taken into account by the differing slopes of lines 12, 13, 14, or in other words by way of a variable rate of change for the reduction.

Figure 2:
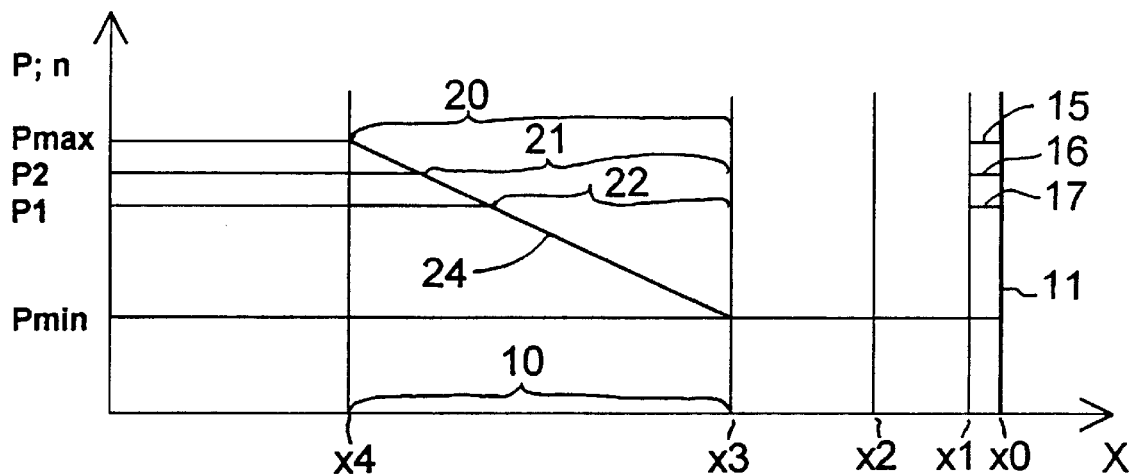
FIG. 2 schematically shows a diagram of a second embodiment of the displacement drive according to the present invention, in which an obstruction prevention function is provided and in which a linear velocity reduction takes place over a variable position range with a constant change in velocity.

In the case of the embodiment of the present invention for which a diagram is depicted schematically in FIG. 2, in the specific position range 10, i.e. between positions x4 and x3, the linear reduction to the minimum rotation speed $n_{min}$ or minimum output $P_{min}$ is accomplished over variable reduction distances, the starting points thereof changing as a function of the instantaneous supply output level, in particular the supply voltage. The slope of lines 24 is constant, corresponding to a constant rate of change for the reduction. The starting point for the beginning of the respective reduction varies in accordance with the various supply output levels, in particular the supply voltage of a motor vehicle battery. Since the reduction is complete in each case at position x3, the reduction distance labeled 20 at maximum supply output $P_{max}$ is the longest. The associated reduction distance 21 is shorter to correspond with the lower output P2. The reduction distance labeled 22 is even shorter, in accordance with the supply output PI which is even lower as compared with P2. With this embodiment, the differences in instantaneous supply output level are taken into account by way of the variable length of reduction distances 20, 21, 22, at a constant rate of change for the reduction.

The displacement drive configured according to the present invention is advantageously used together with a circuit for preventing jamming of foreign objects between the moved part and fixed stop, labeled 11 in the Figures, in the "closed" position x0. The reduction rates resulting from the reduction according to the present invention are small compared with those which are evoked in the obstruction events. As a result, the actual obstruction prevention function, in which the closing movement is immediately halted and the rotation direction is optionally reversed, is left substantially uninfluenced. Since the linear slope of the reduction is known in each case, this can be taken into account by way of corresponding correction values when calculating the rotation speed reduction resulting from obstruction events. In particular, a suitable adaptive memory in which "self-taught" slowings of the system are stored can be provided for the correction. In this case, the linear controlled reduction in output and/or rotation speed according to the present invention is saved and stored as a slight slowing. In calculating the rotation speed reduction due to obstruction (the obstruction prevention function), on the other hand, the linear rotation speed reduction is calculated out.

With the displacement drive according to the present invention, according to an advantageous embodiment control of the rotation speed or output is accomplished by way of semiconductor components, in particular in the form of a linear controller or a clock-pulse controller having a variable pulse-to-interpulse ratio. In this context, an electrical drive motor is preferably used as the drive motor.

In a further embodiment of the present invention, an additional improvement in obstruction prevention function analysis can be achieved in that an increased resolution is used for position sensing. This can happen with the use of an EXOR member between two Hall sensors which output 90-degree phase-shifted position signals of the motor shaft, thus allowing a doubling in position accuracy to be attained. It can also be accomplished, however, together with or by the alternative use of a multiply polarized ring magnet.

The displacement drive according to the present invention is used in particular for opening and closing windows and sunroofs of motor vehicles. In this context, the position values indicated in FIGS. 1 and 2 may be approximately 500 mm for x4, approximately 50 mm for x3, approximately 25 mm for x2, and approximately 4 mm for x1, in each case before the "closed" position x0. Position x2 at about 25 mm means, for many applications, the value at which the kinetic energy must in all cases be reduced to a value which is still sufficient for the obstruction forces to fall below a specific value, for example to be less than 100 N, the forces being measured on elastic rods whose spring rate is 65 N/mm. The value for x3 is selected as approximately 50 mm for this reason, so that the reduction in rotation speed and/or output to the minimum value is achieved in all cases, even under the most unfavorable conditions, at this predefined limit value. For an opening width of less than approximately 4 mm, i.e. between position x1 and x0, in the "rubber seal" range, the output P or rotation speed n can be raised back to the full output in order to obtain maximum closing forces. This is indicated in the two Figures by reference characters 15, 16, 17, which are associated accordingly with the respective instantaneous outputs $P_{max}$, P2, and P1.

As a result of the reduction according to the present invention, in accordance with a predefined functional relationship, in the velocity of the displacement drive to a minimum output and/or rotation speed value, the rate of change is known and predictable. This reduction is accomplished either over a constant range with a variable slope corresponding to the supply output level, or with a variable length or duration corresponding to the supply output level. In either case, the reduction to a minimum value takes place in an optimized manner to a target point. The change in rotation speed evoked by the reduction in output and/or rotation speed performed according to the present invention is small compared to that evoked by obstruction events. When combined with a obstruction prevention circuit, the precondition is therefore created that because of the known rate of change, the obstruction prevention function is optimally and independently effective, substantially unaffected thereby.

What is claimed is:

1. A displacement drive having an obstruction prevention function for a movable part, comprising:
    a first arrangement for stopping one of a rotation speed of the displacement drive and a velocity of the displacement drive in response to an obstruction in the path of the movable part; and
    a second arrangement for reducing according to a predefined functional relationship, before a closed position of the movable part is reached and within the specific displacement range, one of the rotation speed and an output of the displacement drive to a corresponding one of a minimum rotation speed and a minimum output, wherein:
        the reduction to one of the minimum rotation speed and the minimum output is performed within a specific position range,
        one of the minimum rotation speed and the minimum output is achieved at a specific position before the closed position of the movable part, and
        one of the minimum rotation speed and the minimum output is substantially constant for a finite period of time prior to the movable part reaching the closed position.

2. The displacement drive according to claim 1, wherein the movable part includes one of a window of a motor vehicle and a sunroof of the motor vehicle.

3. The displacement drive according to claim 1, wherein the second arrangement reduces the one of the rotation speed and the output in accordance with the predefined functional relationship to the corresponding one of the minimum rotation speed and the minimum output over a constant position range, and wherein a rate of reduction performed by the second arrangement changes as a function of an instantaneous power supply level provided by a supply voltage.

4. The displacement drive as defined in claim 1, wherein the second arrangement reduces the one of the rotation speed and the output in accordance with the predefined functional relationship to the corresponding one of the minimum rotation speed and the minimum output over a variable position range, and wherein a starting point of the reduction performed by the second arrangement changes as a function of an instantaneous power supply level provided by a supply voltage.

5. The displacement drive according to claim 1, wherein the reduction provided by the second arrangement is performed on a linear basis.

6. The displacement drive according to claim 1, wherein the reduction provided by the second arrangement is performed in accordance with an exponential function.

7. The displacement drive according to claim 1, wherein the second arrangement determines one of the minimum rotation speed and the minimum output empirically in order to provide a sufficiently high closing force for the movable part under an influence of a condition.

8. The displacement drive according to claim 7, wherein the condition includes one of a temperature condition and a humidity condition.

9. The displacement drive according to claim 1, wherein the second arrangement includes a plurality of semiconductor components.

10. The displacement drive according to claim 9, wherein each of the plurality of semiconductor components includes one of a linear controller and a clock-pulse controller having a variable pulse-to-interpulse ratio.

11. The displacement drive according to claim 1, wherein the displacement drive is an electric drive.

12. The displacement drive according to claim 1, further comprising a connection to a circuit for preventing the movable part from pinching a foreign object against a fixed stop.

13. The displacement drive according to claim 1, wherein the second arrangement calculates the reduction in the rotation speed due to an obstruction event as a function of a correction factor including a slope of the reduction of one of the rotation speed and the output in accordance with the predefined functional relationship.

14. The displacement drive according to claim 13, further comprising an adaptive memory for storing the reduction in at least one of the rotation speed and the output as a slight slowing.

15. The displacement drive according to claim 1, wherein the second arrangement increases one of the rotation speed and the output to a maximum value in order to provide a maximum closing force for the movable part when the movable part is within a predetermined opening width from the closed position.

16. The displacement drive according to claim 15, wherein the predetermined opening width is less than approximately 4 mm.

17. The displacement drive according to claim 15, wherein the predetermined opening width is in an area of a rubber seal.

18. The displacement drive according to claim 1, wherein one of the minimum rotation speed and the minimum output is substantially constant for a finite period of time prior to, and up to, the movable part reaching the closed position.

19. A displacement drive having an obstruction prevention function for a movable part, comprising:

a first arrangement for stopping one of a rotation speed of the displacement drive and a velocity of the displacement drive in response to an obstruction in the path of the movable part; and a second arrangement for reducing according to a predefined functional relationship, before a closed position of the movable part is reached and within the specific displacement range, one of the rotation speed and an output of the displacement drive to a corresponding one of a minimum rotation speed and a minimum output;

wherein the reduction to one of the minimum rotation speed and the minimum output is performed within a specific position range, one of the minimum rotation speed and the minimum output is achieved at a specific position before the closed position of the movable part, and one of the minimum rotation speed and the minimum output is substantially constant for a finite period of time prior to the movable part reaching the closed position, and wherein the second arrangement subsequently increases one of the rotation speed and the output to a maximum value in order to provide a maximum closing force for the movable part when the movable part is less than approximately 4 mm from the closed position in an area of a rubber seal.

* * * * *